UNITED STATES PATENT OFFICE.

KARL SCHIRMACHER, OF HÖCHST-ON-THE-MAIN, GERMANY, ASSIGNOR TO THE FARBWERKE, VORMALS MEISTER, LUCIUS & BRÜNING, OF SAME PLACE.

BROWN DYE AND PROCESS OF MAKING SAME.

SPECIFICATION forming part of Letters Patent No. 647,236, dated April 10, 1900.

Application filed January 24, 1899. Serial No. 703,279. (Specimens.)

*To all whom it may concern:*

Be it known that I, KARL SCHIRMACHER, Ph. D., a citizen of the Empire of Germany, residing at Höchst-on-the-Main, Germany, have invented certain new and useful Improvements in the Manufacture of Brown Dyestuffs for Wool, of which the following is a specification.

I have found that by the action of diazotized nitro and sulfonic derivatives of ortho-amidophenol—such as $1:2:3:5$ and $1:2:5:3$ nitroamidophenolsulfonic acids, picramic acid, or amidophenolsulfonic—acid upon meta-phenylenediamin or meta-toluylenediamin or their sulfonic acids new brown dyestuffs may be obtained which are valuable for properties superior to those of other dyestuffs. If wool be dyed with these coloring-matters and subsequently treated with bichromate, then the intensity of shade increases and the dye is characterized at the same time by superior fastness. The existence and position of the hydroxyl in these dyestuffs appear to be of great influence, as similarly-formed dyestuffs not containing this group or containing it in a different position cannot be obtained in the same manner in equally fast shades.

The process is illustrated by the following examples:

Example I: 23.4 kilos of nitroamidophenolsulfonic acid are diazotized by means of thirty-two kilos of hydrochloric acid and 6.9 kilos of sodium nitrite, and the product is introduced into a solution of 10.8 kilos of meta-phenylenediamin and twenty-six kilos of sodium acetate. The dyestuff is formed at once, and after being allowed to stand for a short time it is salted out. It is in the form of a greenish-brown powder soluble in water with a brown-red and with a somewhat more yellow color in water made alkaline. The solution in concentrated sulfuric acid is yellow red.

Example II: 19.9 kilos of picramic acid are diazotized in the usual manner and introduced into an aqueous solution of 18.8 kilos of meta-phenylenediaminsulfonic acid and twenty-six kilos of sodium acetate. After standing for twelve hours the dyestuff is salted out. It is in the form of a brown powder soluble in water with a red-brown color, which on addition of alkalies becomes more yellow. The solution in concentrated sulfuric acid is carmin-red.

Example III: 18.9 kilos of $1:2:5$-amidophenolsulfonic acid are diazotized with thirty kilos of hydrochloric acid and 6.9 kilos of sodium nitrite. The diazo solution is then poured into an aqueous solution of 12.2 kilos of meta-toluylenediamin and twenty-six kilos of sodium acetate and allowed to stand for from two to three days while being well stirred, the formation of the dyestuff proceeding slowly. The dyestuff on being salted out and dried in the usual manner is in the form of a brown powder soluble in water with a brown color. Its tint does not change on addition of alkali. The solution in concentrated sulfuric acid is brown.

Example IV: 19.9 kilos of picramic acid are diazotized and the diazo compound is introduced into a solution of twenty-one kilos of meta-toluylenediaminsulfonic acid and twenty-six kilos of sodium acetate. After standing about twelve hours the dyestuff is salted out and filtered. When in a dry state, the dyestuff is in the form of a brown powder soluble in water with a reddish-brown color and in sulfuric acid with a brownish-yellow color.

Addition of alkalies only slightly changes the tints of the aqueous solution, which becomes a pale yellow.

Having now described my invention, what I claim is—

1. The herein-described process for the manufacture of brown dyestuffs for wool, which consists in diazotizing and combining herein-described derivatives of ortho-amidophenol with meta-diamins and their sulfonic acids, substantially as described.

2. The herein-described process for the manufacture of a brown dyestuff for wool, which consists in combining diazotized picramic acids with meta-phenylenediaminsulfonic acid, substantially as described.

3. As a new product, the dyestuff obtained from picramic acid and meta-phenylenediaminsulfonic acid, being a brown powder, soluble in water with red-brown color, which, on addition of alkalies becomes more yellow, the solution in concentrated sulfuric acid being carmin-red.

In testimony that I claim the foregoing as my invention I have signed my name in presence of two subscribing witnesses.

KARL SCHIRMACHER.

Witnesses:
HEINRICH HAHN,
ALFRED BRISBOIS.